US011255386B2

United States Patent
Klück et al.

(10) Patent No.: US 11,255,386 B2
(45) Date of Patent: Feb. 22, 2022

(54) CLUTCH ACTUATOR FOR ACTUATING A VEHICLE CLUTCH

(71) Applicant: WABCO GmbH, Hannover (DE)

(72) Inventors: Frank-Peter Klück, Springe (DE); Sankar Prasad Mishra, Hannover (DE); Tobias Schulz, Pattensen (DE)

(73) Assignee: WABCO GmbH, Hannover (DE)

( * ) Notice: Subject to any disclaimer, the term of this patent is extended or adjusted under 35 U.S.C. 154(b) by 0 days.

(21) Appl. No.: 16/772,275

(22) PCT Filed: Sep. 10, 2018

(86) PCT No.: PCT/EP2018/074243
§ 371 (c)(1),
(2) Date: Jun. 12, 2020

(87) PCT Pub. No.: WO2019/115029
PCT Pub. Date: Jun. 20, 2019

(65) Prior Publication Data
US 2020/0300309 A1  Sep. 24, 2020

(30) Foreign Application Priority Data
Dec. 13, 2017 (DE) ............... 10 2017 011 528.1

(51) Int. Cl.
*F16D 25/08* (2006.01)
*F16D 25/12* (2006.01)

(52) U.S. Cl.
CPC ......... *F16D 25/083* (2013.01); *F16D 25/087* (2013.01); *F16D 25/12* (2013.01); *F16D 2250/0084* (2013.01)

(58) Field of Classification Search
CPC ...... F16D 25/083; F16D 25/087; F16D 25/12; F16J 1/02
(Continued)

(56) References Cited

U.S. PATENT DOCUMENTS 3,881,791 A * 5/1975 Hentschel ............... F16C 33/04
384/125
5,743,370 A * 4/1998 Thomire ............... F16D 25/083
192/85.51
(Continued)

FOREIGN PATENT DOCUMENTS

DE  10253021 A1  5/2004
DE  102007032488 A1  2/2008
(Continued)

OTHER PUBLICATIONS

European Patent Office, Rijswijk, Netherlands, International Search Report of International Application No. PCT/EP2018/074243, dated Dec. 7, 2018, 2 pages.

*Primary Examiner* — Richard M Lorence
(74) *Attorney, Agent, or Firm* — Dickinson Wright PLLC

(57) ABSTRACT

A clutch actuator (1) for actuating a vehicle clutch includes a cylinder (3) filled with pressure medium. An annular piston (4) is axially displaceably arranged in the cylinder. The annular piston (4) is fixedly operatively connected to a sliding sleeve (5) slidably mounted on a guide sleeve (6). A radially inner casing surface (16) of the annular piston (4) has an inner radius (Ri) and is arranged radially next to the guide sleeve (6). A sliding ring (18; 19) supports the sliding sleeve (5) on the guide sleeve (6). The sliding ring (18; 19; 18a) is inserted into a groove (27; 28) in the radially inner casing surface (16). In order to be able to mount undivided sliding rings, the groove (27; 28) has a single radially extending groove wall (29; 32) and is open toward an axially outer or inner end face (30; 33) of the annular piston (4).

11 Claims, 3 Drawing Sheets

(58) Field of Classification Search
USPC .................. 192/85.51, 85.53, 98; 92/DIG. 1
See application file for complete search history.

(56) References Cited

U.S. PATENT DOCUMENTS

| | | | |
|---|---|---|---|
| 6,422,370 B1 | 7/2002 | Thomire | |
| 2008/0196993 A1* | 8/2008 | McCutcheon | ........ F16D 23/148 |
| | | | 192/98 |

FOREIGN PATENT DOCUMENTS

| | | |
|---|---|---|
| DE | 102009019999 A1 | 12/2009 |
| DE | 10080372 B4 | 3/2011 |
| DE | 102013219842 A1 | 4/2014 |
| DE | 102016012865 A1 | 5/2018 |
| DE | 102017001410 A1 | 8/2018 |
| EP | 1887242 A2 | 2/2008 |
| WO | 2011103894 A1 | 9/2011 |
| WO | 2011103896 A1 | 9/2011 |

* cited by examiner

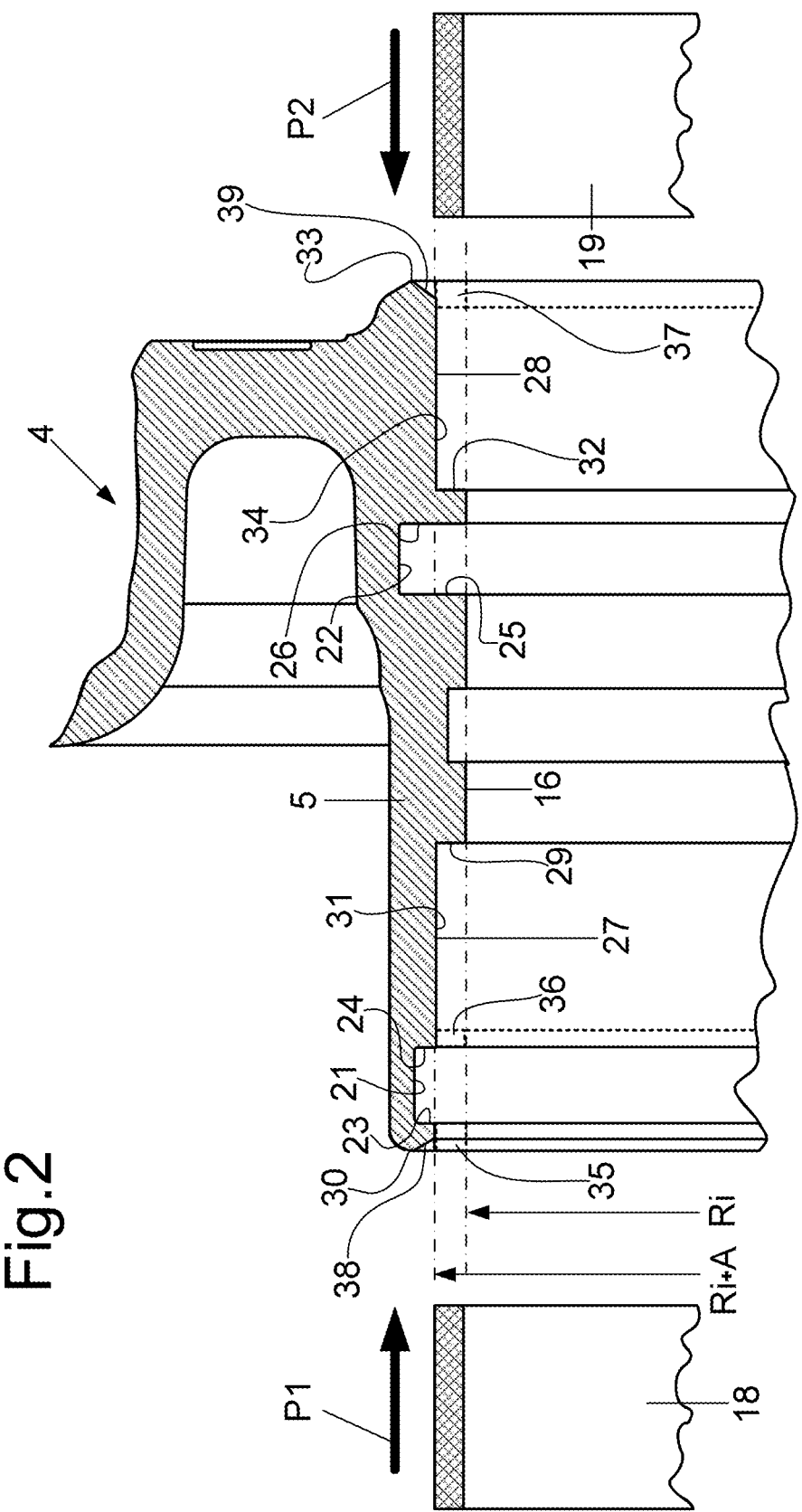

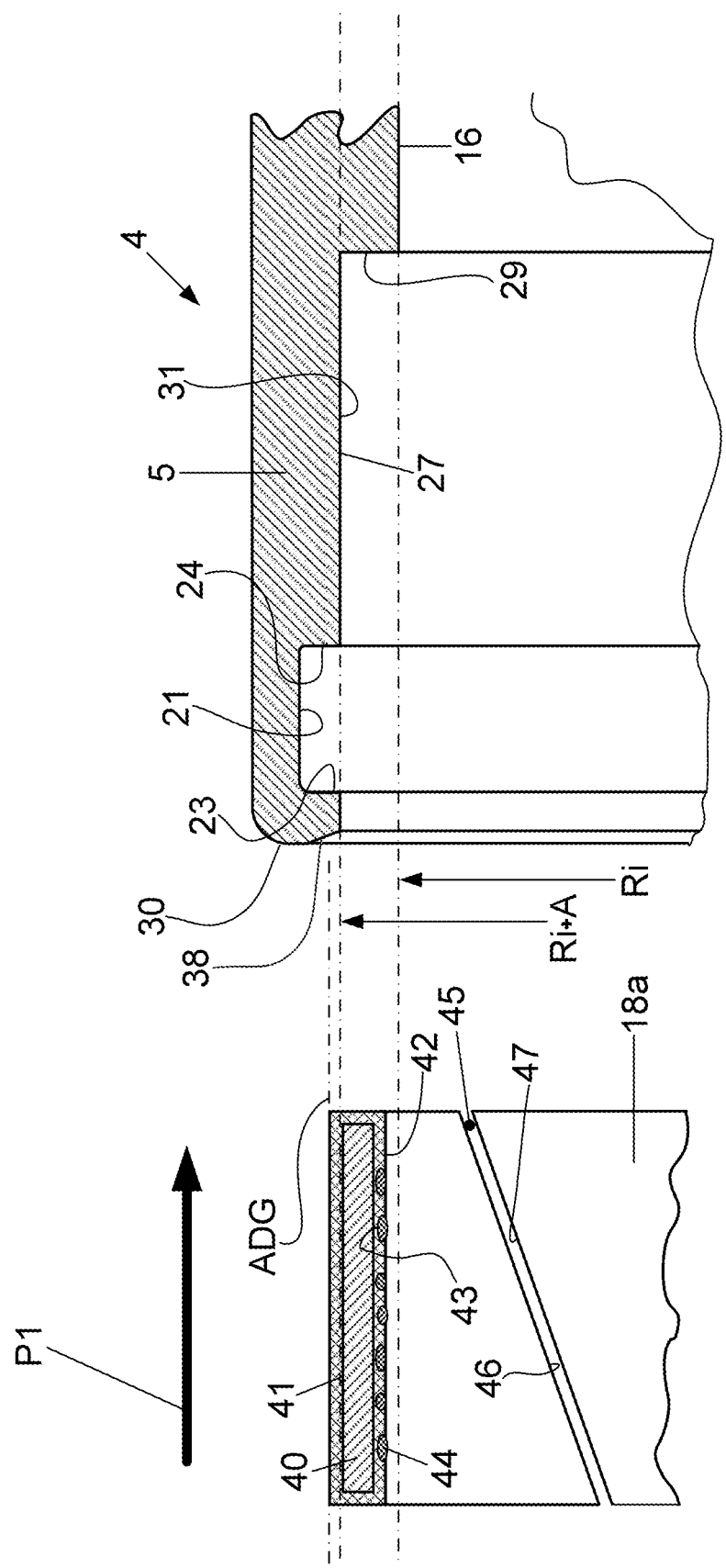

CLUTCH ACTUATOR FOR ACTUATING A VEHICLE CLUTCH

TECHNICAL FIELD

The invention concerns a clutch actuator for actuating a vehicle clutch comprising a cylinder which is filled with pressure medium and in which an annular piston is arranged so as to be axially displaceable, wherein the annular piston is fixedly operatively connected to a sliding sleeve which in turn is axially slidably mounted on a guide sleeve, wherein a radially inner casing surface of the annular piston has an inner radius and is arranged in an immediate radial vicinity of the guide sleeve, and further comprising at least one sliding ring, which supports the sliding sleeve on the guide sleeve, wherein the at least one sliding ring is inserted into a groove in the radially inner casing surface of the annular piston.

BACKGROUND

Clutch actuators for actuating a vehicle clutch are known, in which an annular piston, which can be loaded with compressed air, of a so-called central release unit is mounted via a sliding sleeve so as to be axially movable along a guide sleeve. In such central release units, also known as "concentric pneumatic clutch actuators", normally at least one sliding ring is provided which serves to slide the annular piston along the guide sleeve.

Previously, the sliding ring or rings were each mounted in a groove in the radially inner casing surface. This groove has two radially extending groove walls which axially delimit the sliding ring and hold it in place. Because of the structural circumstances, previously it was only possible to use sliding rings which were slotted. Such an arrangement is known in particular from DE 102 53 021 A1. Inserting slotted sliding rings in the assigned grooves causes no problems in production and such arrangements have proved suitable. Similar arrangements are known from DE 10 2013 219 842 A1, EP 2 539 597 B1 and EP 2 539 598 B1.

During operation of such clutch actuators, it is extremely important to determine the position of the annular piston. The axial position of the annular piston relative to the guide sleeve is here measured by sensor elements arranged externally on the clutch actuator. Even very small tolerances or tilting of the annular piston can lead to measurement errors, so the person skilled in the art has for a long time aimed to eliminate the error sources for measurement errors as completely as possible. It has been found that the sliding rings themselves may contribute to the measurement errors, namely by the rotational movement around the respective retaining groove. The cause of such movements are the slotted sliding rings inserted into the groove up to contact. Since a divided sliding ring placed up to contact will always tend to move during operation of the clutch actuator, it would theoretically be advantageous if undivided sliding rings could be used, so that any rotational or axial movement of the respective sliding ring becomes impossible. However, the former design of the grooves prevents this, since it is almost impossible to insert undivided sliding rings.

SUMMARY

It is desirable to improve a clutch actuator of the type outlined initially so that undivided sliding rings can be used for these.

The is achieved in a surprisingly simple fashion, in that here the groove is no longer provided with two groove walls delimiting the sliding ring, as was previously known from the prior art, but the groove for a sliding ring is open towards an axial end face of the annular piston. This means that only one groove wall is provided, against which the sliding ring stops axially. Such a configuration, as provided according to a refinement of the invention, allows the use of closed sliding rings and allows a method in which the respective closed sliding ring is pressed axially with press fit into the radially inner casing surface of the annular piston.

In a practical refinement of the invention, it may be provided that a shoulder is provided in the axially outer and/or axially inner end face of the annular piston, which shoulder increases the inner radius of the radially inner casing surface of the annular piston, constantly as far as the groove wall of the at least one sliding ring, to a greater shoulder radius, wherein the shoulder radius is greater by the amount of the shoulder or the radial height of the groove wall of the groove.

Also advantageous is a refinement of the invention which provides that two sliding rings are inserted in the radially inner casing surface of the annular piston, wherein the grooves in which the sliding rings are inserted each has a single radially extending groove wall, wherein the grooves are each open towards an axially outer or inner end face of the annular piston.

This embodiment can be supplemented if it is provided that a shoulder is provided in each of the axially outer and axially inner end faces of the annular piston, which shoulder increases the inner radius of the radially inner casing surface of the annular piston, constantly as far as the groove wall of the respective sliding ring, to a greater shoulder radius, wherein the shoulder radius is greater by the amount of the shoulder or the radial height of the groove wall of the groove.

Also advantageous is a practical refinement of the invention in which it is provided that both shoulders have the same shoulder radius. In this case, identical sliding rings may be used.

An embodiment of the invention which provides that the at least one radially inner sliding ring is formed as a closed ring, is particularly preferred.

In an equally practical addition to the invention, it is provided that the at least one radially inner sliding ring consists of plastic.

Alternatively, it may be provided that the at least one radially inner sliding ring has a core of a metallic material, wherein a plastic coating is applied around said core, wherein the thickness of the core is between 1 and 2 mm, preferably 1.5 mm, and wherein the layer thickness of the plastic coating is between 0.2 and 1 mm, preferably 0.5 mm.

This embodiment may be supplemented further if it is provided that the at least one radially inner sliding ring is radially divided and has a dividing joint, wherein when the sliding ring has been pressed into the associated groove of the sliding sleeve, the joint edges of the sliding ring abut each other. As stated initially, although undivided sliding rings are preferred, the design of the sliding sleeve of the annular piston with a groove open towards an axial end and with only one groove wall extending radially, is also advantageous for mounting of radially divided sliding rings, namely when the sliding ring has a core of steel or a metallic material which is particularly rigid and, because of its thickness, cannot be inserted or only inserted insufficiently into conventional ring grooves with two ring groove walls.

The invention also concerns a method for producing a clutch actuator for actuating a vehicle clutch of the above-described type, wherein at least one shoulder is formed in at least one end face of the annular piston, and a closed sliding ring is pressed axially with press fit into said shoulder. To produce the shoulder, the annular piston may be provided with the shoulder during an injection-molding process, or the shoulder may be produced in the radially inner casing surface of the annular piston by material removal after production of the annular piston blank. After the shoulder or shoulders have been produced, the respective sliding ring is pressed axially into the associated shoulder with press fit. The sliding rings may have a degree of oversize, which improves the press fit.

The invention will be explained in more detail below with reference to the following description of the figures.

BRIEF DESCRIPTION OF THE DRAWINGS

In the drawings,

FIG. 2 shows an annular piston of the clutch actuator from FIG. 1 in a detail view, and FIG. 3 shows a sliding sleeve of the annular piston from FIG. 2 in a further enlarged, outline sectional view.

DETAILED DESCRIPTION OF THE DRAWINGS

Figure 1:
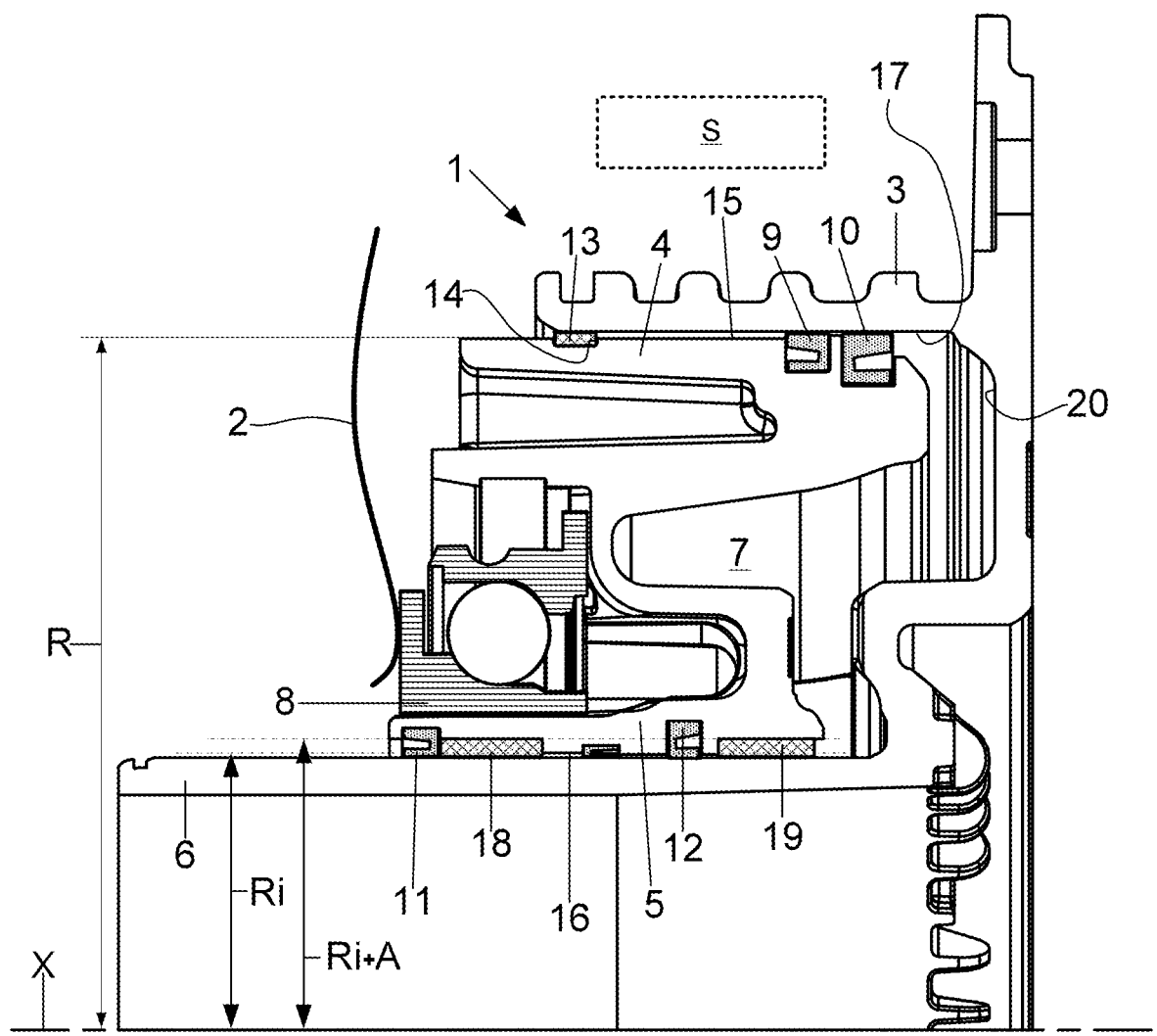
FIG. 1 shows an exemplary embodiment of a clutch actuator in a half longitudinal sectional depiction.

FIG. 1 shows a half longitudinal sectional view of an exemplary embodiment of a clutch actuator 1 according to the invention for actuating a switchable vehicle clutch, of which the drawing depicts symbolically a release lever 2 in the form of a tongue of a diaphragm spring. The clutch actuator 1 comprises a cylinder 3 which is filled with a hydraulic or gaseous pressure medium and in which an axially displaceable annular piston 4 is arranged. A sliding sleeve 5 is stationarily and operatively connected to the annular piston 4 and is itself mounted on a guide sleeve 6. The phrase "stationarily and operatively connected" may mean that the annular piston 4 and the sliding sleeve 5 are formed of one piece, e.g. as a casting, as shown in FIG. 1. However, it is also within the scope of the invention if the sliding sleeve 5 is a separate component which is connected to the annular piston 4 in a suitable fashion.

The cylinder 3, the annular piston 4 and the sliding sleeve 5, together with the guide sleeve 6, form a working chamber 7 which is filled as required with the pressure medium, and hence triggers a sliding movement of the annular piston 4 by the sliding sleeve 5. The axial sliding movement of the annular piston 4 along an axial center axis X may be supported by a preload spring (not shown in FIG. 1), and is transmitted to a bearing 8 which in turn transmits the sliding movement of the annular piston 4 to the release lever 2. The axial sliding movement of the annular piston 4, or its respective axial position on the guide sleeve, is detected by a sensor S, which is merely indicated in FIG. 1.

The working chamber 7 is sealed by two ring seals 9, 10 on the annular piston 4, and by two seals 11, 12 between the sliding sleeve 5 and the guide sleeve 6. A sliding ring 13 is laid in the radially upper ring groove 14. The radially upper ring groove 14 is provided in a radially upper or outer casing surface 15 of the annular piston 4.

The terms "radially upper", "radially outer", "radially lower" or "radially inner" in the description below refer to the arrangement of details of the annular piston 4 relative to the radius R of the annular piston 4; thus a radially lower or inner casing surface 16 of the annular piston 4 is arranged in the immediate vicinity of the surface of the guide sleeve 6, while the radially upper or outer casing surface 15 of the annular piston 4 is arranged in the immediate vicinity of an inner, radially outwardly arranged casing surface 17 of the cylinder 3.

Two sliding rings 18, 19 are inserted radially inwardly in the radially inner casing surface 16 of the annular piston 4. An axially outer and radially inner sliding ring 18 is axially spaced from the working chamber 7 and arranged radially below the bearing 8, while an axially and radially inner sliding ring 19 is arranged radially below the working chamber 7 and axially in the vicinity of a rear wall 20 of the cylinder 3.

The radially inner sliding rings 18, 19 are each formed as closed rings and consist of a plastic with good slip properties. In order to increase the continuous load capacity, the rings have a metal insert.

FIG. 2 shows an enlarged, outline view of the annular piston 4 from FIG. 1. FIG. 2 shows the special design of the radially inner casing surface 16 of the annular piston 1 for insertion of the radially inner sliding rings 18, 19.

Whereas, for insertion of the seals 11, 12 (not shown in FIG. 2), conventional grooves 21, 22 are provided with groove walls 23, 24 and 25, 26 axially delimiting the grooves and extending radially, the grooves 27, 28 for holding and mounting the radially inner sliding rings 18, 19 are each formed open axially outwardly or inwardly. This means that the groove 27 for holding and mounting the axially outer and radially inner sliding ring 18 has only one groove wall 29 arranged axially on the inside, while the groove 27 is otherwise open towards the axial outside. For this, a shoulder 31 is provided in an axially outer end face 30 of the annular piston 4, which increases the inner radius Ri of the radially inner casing surface 16 of the annular piston 4, constantly up to the groove wall 29 of the axially outer sliding ring 18, to a correspondingly greater shoulder radius Ri+A, wherein the radius Ri+A is greater by the amount of the shoulder 31 or the radial height of the groove wall 29 of the groove 27.

The same applies to the groove 28 of the axially inner sliding ring 19. The groove 28 of the radially and axially inner sliding ring 19 has only one groove wall 32 which is arranged facing axially outward, i.e. towards the rear wall 20 of the cylinder 3, while the groove 28 is otherwise open axially towards the inside. Here, a shoulder 34 is provided in an axially inner end face 33 of the annular piston 4, which increases the inner radius Ri of the radially inner casing surface 16 of the annular piston 4, constantly up to the groove wall 32 of the axially outer sliding ring 18, to a correspondingly greater shoulder radius Ri+A, wherein the radius Ri+A is greater by the amount of the shoulder 34 or the radial height of the groove wall 32 of the groove 28.

The two shoulders 31, 34 have the same radius, which may be advantageous because sliding rings 18, 19 of the same dimensions can be used.

To mount the undivided sliding rings 18, 19, these are pressed axially with press fit into the shoulders 31, 32, as indicated by arrows P1, P2. The axially outwardly or inwardly open shoulders 31, 34 allow undivided sliding rings to be pressed in from the first time. Because the shoulders have a constant radius Ri+A as far as the respective assigned end face 30, 33 of the annular piston 4, the radial length or height of the groove walls 23, 24 of the groove 21, which would otherwise extend up to the casing surface 16 or up to the inner radius Ri, is also reduced by this radius, but this is acceptable since the seal 11 (not shown in FIG. 2) is still adequately guided and can fulfil its sealing function.

If however it should be necessary to guide the seal 21 by longer or radially deeper groove walls, after mounting of the sliding rings 18, 19, adapter rings 35, 36 may be inserted in the shoulder 31, whereby the annular piston 4 is simultaneously terminated dust-tightly. The adapter rings 35, 36 are here shown in dotted lines. Accordingly, the axially inner shoulder 34 may also be closed by a terminating ring 37; this terminating ring 37 is also indicated by dotted lines. In order to facilitate the axial insertion of the sliding rings 18, 19, the axially outer end face 30 of the piston 4 or the sliding sleeve 5 transforms into the shoulder 31 via a cone 38. Correspondingly, the axially inner end face 33 of the piston 4 or sliding sleeve 5 also transforms into the shoulder 34 via a cone 39.

The groove 14 of the radially upper sliding ring 13 may also be configured in the same way as the grooves 27, 28 of the radially inner sliding rings 18, 19, i.e. also be designed open axially towards the outside. In this case, the radially upper ring groove 14 would only have one radially extending groove wall, whereby also the radially upper sliding ring 13 may be made of one piece and be pressed on axially.

FIG. 3 shows the sliding sleeve 5 of the annular piston 4 from FIG. 2 in a further enlarged, outline sectional depiction. The sliding sleeve 5 here corresponds precisely to the sliding sleeve 4 from FIG. 2, so the statements made with respect to FIG. 2 also apply to the sliding sleeve 5 according to FIG. 3. Only the axially outer and radially inner sliding ring 18a differs from the sliding ring 18 in FIGS. 1 and 2. Whereas the sliding rings 18, 19 of FIGS. 1 and 2, as closed sliding rings, each consist of a plastic with good plain-bearing properties, the sliding ring 18a of FIG. 3 is formed as a slotted or radially divided ring. A core 40 of the sliding ring 18a consists of a metallic material, namely rolled steel. The core 40 has a thickness of 1 to 2 mm, preferably 1.5 mm. A plastic coating 41 is applied around the core 40. In the exemplary embodiment shown, the plastic coating 41 consists of polytetrafluoroethylene (PTFE) and has a layer thickness of 0.2 to 1 mm, preferably 0.5 mm. In order to extend the service life of the sliding ring 18a, the plastic coating 41 has pores 43 at least on its radially inner casing surface 42, which pores are filled with grease particles 44.

The divided sliding ring 18a has a dividing joint 45; when pressed in, the joint edges 46, 47 abut each other.

The sliding ring 18a is mounted in the same way as the mounting of the sliding rings 18, 19 described above. When the sliding ring 18a is pressed on, a press fit is achieved which is secure against twisting; this is ensured in that the starting diameter of the sliding ring 18a is greater by at least the width of the dividing joint 45 than in the pressed state. In any case, the outer diameter ADG of the sliding ring 18a is greater by at least a certain amount than the theoretical line of the inner radius Ri of the sliding sleeve 5. The axially and radially inner sliding ring (not shown in FIG. 3) may be configured identically to the sliding ring 18a; alternatively, it is also possible to configure the axially and radially inner sliding ring correspondingly to the sliding ring 19 of FIG. 2, i.e. as a closed sliding ring made of plastic, for example PTFE.

The embodiment of the sliding sleeve 5 of the annular piston 4, with the grooves 27, 28 described above, each with only one groove wall 29, 32, is also of great advantage for mounting of the sliding ring 18a, since divided rings with a relatively thick and rigid core 40 of steel also could not previously be mounted. Such cores are so rigid that they cannot be inserted in normal ring grooves with at least two groove walls.

The clutch actuator 1 shown in FIG. 1 is preferably used as a "central pneumatic clutch actuator" (CPCA) of an automated manual transmission of a heavy utility vehicle. Here, the clutch actuator 1 may also be designed to be self-adjusting, as described in the previously unpublished German patent applications DE 10 2016 012 865.8 and DE 10 2017 001 410.8.

While the above description constitutes the preferred embodiments of the present invention, the invention is susceptible to modification, variation and change without departing from the proper scope and fair meaning of the accompanying claims.

What is claimed is:

1. A clutch actuator (1) for actuating a vehicle clutch, comprising a cylinder (3) which is filled with pressure medium and in which an annular piston (4) is arranged so as to be axially displaceable, wherein the annular piston (4) is fixedly operatively connected to a sliding sleeve (5) which in turn is axially slidably mounted on a guide sleeve (6), wherein a radially inner casing surface (16) of the annular piston (4) has an inner radius (Ri) and is arranged in an immediate radial vicinity of the guide sleeve (6), and further comprising at least two sliding rings (18; 19; 18a), which include an axially inner sliding ring (19) and an axially outer sliding ring (18) supporting the sliding sleeve (5) on the guide sleeve (6), wherein the radially inner casing surface (16) of the annular piston (4) has an axially inner groove (27) and an axially outer groove (28), wherein the axially inner groove (27) receives the axially inner sliding ring (19) and the axially outer groove (28) receives the axially outer sliding ring (18), wherein each of the axially inner and the axially outer grooves (27; 28) has a single radially extending groove wall (29; 32), and wherein the axially outer groove (28) is open toward an axially outer end face (30) of the annular piston (4) and the axially inner groove (27) is open to an axially inner end face (33) of the annular piston (4).

2. The clutch actuator as claimed in claim 1, wherein a shoulder (31; 34) in the axially outer end face or axially inner end face (30; 33) of the annular piston increases the inner radius (Ri) of the radially inner casing surface (16) of the annular piston (4) adjacent to the groove wall (29; 32), which is adjacent to one of the at least two sliding rings (18; 19), to a constant shoulder radius (Ri+A) greater than the inner radius, wherein the shoulder radius (Ri+A) is greater than the inner radius by a radial height of the shoulder (31, 34) or a radial height of the groove wall (29, 32) of the groove (27, 28).

3. The clutch actuator as claimed in claim 1, wherein the axially inner sliding ring and the axially outer sliding ring are inserted in the radially inner casing surface (16) of the annular piston (4).

4. The clutch actuator as claimed in claim 3, wherein a shoulder (31, 34) in each of the axially outer and axially inner end faces (30, 33) of the annular piston (4) increases the inner radius (Ri) of the radially inner casing surface (16) of the annular piston (4) adjacent to the groove wall (29, 32), which is adjacent to a respective one of the axially inner and axially outer sliding rings (18, 19; 18a), to a constant shoulder radius (Ri+A) greater than the inner radius, wherein the shoulder radius (Ri+A) is greater than the inner radius by a radial height of the shoulder (31, 34) or a radial height of the groove wall (29, 32) of the groove (27, 28).

5. The clutch actuator as claimed in claim 4, wherein both shoulders (31, 34) have the same shoulder radius (Ri+A).

6. The clutch actuator as claimed in claim 1, wherein at least one of the at least two sliding rings (18; 19) is formed as a closed ring.

7. The clutch actuator as claimed in claim 6, wherein the at least one closed ring is a radially inner sliding ring (18; 19) and consists of plastic.

8. The clutch actuator as claimed in claim 1, wherein at least one of the at least two sliding rings is a radially inner sliding ring (18a) that has a core (40) of a metallic material with a plastic coating (41) around the core (40), wherein the thickness of the core (40) is between 1 and 2 mm, and wherein the plastic coating (41) has thickness between 0.2 and 1 mm.

9. The clutch actuator as claimed in claim 8, wherein the at least one radially inner sliding ring (18a) is radially divided and has a dividing joint (45) and joint edges (46, 47), wherein when one of the at least one radially inner sliding ring (18a) is disposed in the axially inner groove (27) or in the axially outer groove (28) of the sliding sleeve (5), the joint edges (46, 47) of the one of the at least one radially inner sliding ring (18a) abut each other.

10. A method for producing a clutch actuator (1) for actuating a vehicle clutch, the clutch actuator having a cylinder (3) which is filled with pressure medium and in which an annular piston (4) is arranged so as to be axially displaceable, wherein the annular piston (4) is fixedly operatively connected to a sliding sleeve (5) which in turn is axially slidably mounted on a guide sleeve (6), wherein a radially inner casing surface (16) of the annular piston (4) has an inner radius (Ri) and is arranged in an immediate radial vicinity of the guide sleeve (6), and further comprising at least two sliding rings (18; 19; 18a) which include an axially inner sliding ring (19) and an axially outer sliding ring (18) supporting the sliding sleeve (5) on the guide sleeve (6), wherein the radially inner casing surface (16) of the annular piston (4) has an axially inner groove (27) and an axially outer groove (28), wherein the axially inner groove (27) receives the axially inner sliding ring (19) and the axially outer groove (28) receives the axially outer sliding ring (18), wherein each of the axially inner and the axially outer grooves (27; 28) has a single radially extending groove wall (29; 32), and wherein the axially outer groove (28) is open toward an axially outer end face (30) of the annular piston (4) and the axially inner groove (27) is open to an axially inner end face (33) of the annular piston (4), the method comprising the steps of:

forming two shoulders (31; 34) in opposite end faces (30; 33) of the annular piston (4), and axially pressing a respective closed sliding ring (18; 19) with press fit into each of the two shoulders (31; 34).

11. The clutch actuator as claimed in claim 1, wherein the axially inner groove (27) is disposed in the radially inner casing surface and forms a shoulder (31) defining a shoulder radius (Ri+A) and wherein, from the single radially extending groove wall (29) of the axially inner groove (27) to the axially inner end face (30) of the cylinder (3), the cylinder has a radial clearance from a center axis (X) at least equal to the shoulder radius (Ri+A).

* * * * *